United States Patent [19]

Vassiliades

[11] 4,372,583

[45] Feb. 8, 1983

[54] CHROMOGENIC COPY SYSTEM AND METHOD

[76] Inventor: Anthony E. Vassiliades, 8738 Tanager Woods Dr., Cincinnati, Ohio 45242

[21] Appl. No.: 293,602

[22] Filed: Aug. 17, 1981

Related U.S. Application Data

[63] Continuation-in-part of Ser. No. 173,255, Jul. 29, 1980, abandoned.

[51] Int. Cl.[3] .......... B41L 1/20; B32B 5/16; B32B 27/42

[52] U.S. Cl. .......... 282/27.5; 346/135.1; 427/150; 427/151; 427/152; 427/261; 428/195; 428/207; 428/211; 428/320.8; 428/342; 428/530; 428/537; 428/913; 428/914; 544/165; 548/257

[58] Field of Search .......... 282/27.5; 428/914, 537, 428/342, 341, 320.6, 324, 411, 323, 913, 195, 320.8, 207, 530, 211; 427/150, 151, 152, 261, 147; 544/165; 548/257; 346/135.1

[56] References Cited

U.S. PATENT DOCUMENTS

| | | | |
|---|---|---|---|
| 2,981,733 | 4/1961 | Kranz | 544/165 |
| 2,981,738 | 4/1961 | Kranz | 548/257 |
| 3,427,180 | 2/1969 | Phillips, Jr. | 282/27.5 |
| 3,488,207 | 1/1970 | Vassiliades | 282/27.5 |
| 3,516,845 | 6/1970 | Brockett | 282/27.5 |
| 3,672,935 | 6/1972 | Miller et al. | 282/27.5 |
| 3,723,156 | 3/1973 | Brockett et al. | 282/27.5 |
| 3,767,449 | 10/1973 | Hayashi et al. | 428/342 X |
| 3,772,052 | 11/1973 | Kimura et al. | 428/341 |
| 3,819,396 | 6/1974 | Vincent et al. | 428/320.6 |
| 3,821,010 | 6/1974 | Vincent et al. | 428/320.6 |
| 3,864,146 | 2/1975 | Oda et al. | 282/27.5 |
| 3,871,900 | 3/1975 | Hayashi et al. | 282/27.5 |
| 3,896,255 | 7/1975 | Kato et al. | 428/411 |
| 3,924,027 | 12/1975 | Saito et al. | 427/147 |
| 3,934,070 | 1/1976 | Kimura et al. | 428/342 |
| 3,983,292 | 9/1976 | Saito et al. | 428/537 |
| 4,046,941 | 9/1977 | Saito et al. | 428/323 |
| 4,051,303 | 9/1977 | Hayaski et al. | 282/27.5 X |
| 4,076,887 | 2/1978 | Tsuji et al. | 282/27.5 X |
| 4,087,284 | 5/1978 | Golden et al. | 282/27.5 X |
| 4,121,013 | 10/1978 | Miller et al. | 282/27.5 X |
| 4,125,675 | 11/1978 | Sekiguchi et al. | 282/27.5 X |
| 4,147,830 | 4/1979 | Kato et al. | 428/324 |
| 4,159,208 | 6/1979 | Hayashi et al. | 282/27.5 |
| 4,199,619 | 4/1980 | Oda et al. | 282/27.5 X |

FOREIGN PATENT DOCUMENTS 1445113 8/1975 United Kingdom .

*Primary Examiner*—Thomas J. Herbert, Jr.
*Attorney, Agent, or Firm*—Sigalos & Levine

[57] ABSTRACT

A pressure-sensitive chromogenic copy system utilizing a color developer capable of reacting with a chromogen to form a color image, said color developer comprising an oligomeric aromatic carboxylic acid and the method of making such oligomer by reaction of the acid with an aldehyde under alkaline conditions.

17 Claims, No Drawings

CHROMOGENIC COPY SYSTEM AND METHOD

CROSS-REFERENCE TO RELATED APPLICATION

The instant application is a continuation-in-part of Application Ser. No. 173,255, filed July 29, 1980 now abandoned.

BACKGROUND OF THE INVENTION

This invention relates to polymeric color developing materials used in carbonless copying system comprising a substrate bearing said materials in a coating composition.

Copy systems employing chromogenic materials are well known. Such systems usually comprise microcapsules that contain a colorless chromogen (i.e., leuco dye) dissolved in a solvent such as an oil. The microcapsules form a coating on the back or underside of a sheet of paper called a "transfer sheet" or CB (coated back) sheet. The transfer sheet is superimposed over a "receptor sheet" or CF (coated front) sheet, having a color developer for the chromogenic compound coated onto the front thereof. When the microcapsules containing the chromogen(s) are subjected to localized pressure, e.g., typewriter, ballpoint pen, or the like, they are ruptured and the chromogenic material is released and transferred onto the underlying receptor sheet where it reacts with the color developer. The color developer is an electron acceptor substance such as an acid activated clay, or a low molecular weight phenol-formaldehyde resin. Such pressure sensitive copying system may include additional sheets interposed between the top sheet (CB) and the bottom sheet (CF). The interposed sheets are coated on their backside with chromogen-containing microcapsules and on their front side with a color developer. These sheets are known as CFB (coated front and back) sheets. As used herein, the term "transfer sheet" includes any substrate bearing a coating or electron accepting material and includes CF and CFB sheets as previously described.

Chromogenic compounds comprising colorless dye intermediates are conventional. Exemplary of the colorless dye intermediates which are contemplated for use in this invention are leuco dyes such as crystal violate lactone (CVL), derivatives of bis(p-dialkylaminoaryl) methane, dilactones, ureido fluorans, and bisfluorans such as disclosed in U.S. Pat. Nos. 2,981,733, 2,981,738, 3,819,396, and 3,821,010. These dye intermediates are colorless in a neutral or alkaline medium and react to form a visible color in an acidic medium. Thus, when a capsule containing such a compound is ruptured and the compound is discharged onto an absorbent, acidic, electron-acceptor material, such as a paper web coated with an organic or inorganic acid material, a visible color appears or the absorbent material at the point of contact.

Heretofore, pressure-sensitive copy systems have employed acidic clays, and more recently, oil-soluble phenolic resins and/or their metal salts as the receptor materials as disclosed in U.S. Pat. Nos. 3,672,935, 3,723,156 and 3,427,180. Receptor sheets employing acidic clays and phenolic resins as the electron acceptor substances have major disadvantages. For example, images formed on acidic clays are succeptible to deterioration due to heat, moisture and light upon prolonged exposure to atmospheric conditions. Furthermore, acidic clays present severe rheological problems such as extremely high viscosities and dewatering during the preparation of the coating formulation and the application of said coating formulation to the paper web. Additionally, papers coated with acidic clays are highly abrasive and have a tendency to yellow severely upon aging. The oil-soluble phenolic resins offer some improvement over the acidic clays such as improved resistance to moisture, but they too have major drawbacks. For example, prolonged exposure of receptor coatings containing phenolic resins to heat and/or light causes the "splitting off" of phenolic groups and results in an overall degradation of the resin. Such degradation of the resin is reflected in yellowing of the coated sheets, fading of the formed image, and loss of image-forming ability of the receptor sheet. Furthermore, the presence of such free phenolic groups present environmental and health hazards.

The use of certain aromatic carboxylic acids as electron acceptors or color developers in carbonless copying systems is also known. For example, U.S. Pat. Nos. 3,488,207, 3,871,900, 3,934,070, and 3,983,292 disclose the use of such aromatic carboxylic acids and/or their metallic salts as reactive materials for chromogens. These aromatic carboxylic acids are capable of developing images which are superior in intensity and stability to those formed by acidic clays and phenolic resins. Several of these aromatic carboxylic acids, however, present severe problems such as extremely high viscosities and excessive foaming during the preparation of the coating solution and the application of said solution to the web. These problems render the use of such materials impractical in large scale, commercial manufacturing operations. Furthermore, several of these aromatic carboxylic acids possess some undesirable features such as, slow rate of reaction with the chromogen, low sublimation point resulting in an unstable receptor sheet, and form images of low intensity and stability.

SUMMARY OF THE INVENTION

It has now been discovered that a highly reactive, aesthetically attractive and extremely stable transfer sheet and chromogenic copy system can be provided which eliminate the problems of the prior art.

Briefly stated, the present invention comprises a pressure-sensitive chromogenic copy system comprising a transfer sheet having on at least one surface thereof a color developer capable of reacting with a chromogen to form a color image, said color developer comprising an oligomeric aromatic carboxylic acid. The invention also relates to transfer sheets utilizing said oligomeric compounds and to the compounds and method of making them as more fully described below.

DETAILED DESCRIPTION

The critical feature of the instant invention is the controlled reaction of aromatic carboxylic acids with aldehydes under alkaline conditions to form "oligomers". While not entirely understood, the instant reaction products are similar to resoles; A-stage resoles or salicylate alcohols, formed by reacting a phenol with an aldehyde under alkaline conditions. As used herein, the term "oligomer" is meant to denote such reaction products as distinguished from dimers and polymers which result when aromatic carboxylic acids are polymerized under acidic conditions.

Higher molecular weight polymers can result in low oil affinity and hence undesirable slower image formation when the chromogen-containing oil from the ruptured microcapsules is transferred to the transfer sheet containing the acidic polymer.

The aromatic carboxylic acid used can be any polymerizable substituted or unsubstituted salicylic, benzoic, or napthoic acid. It is preferred to use compounds which do not contain substituents of a size or location on the compound so as to create steric hindrances and thereby retard or even prevent polymerization. Examples of suitable acids are salicylic acid; acetyl salicylic acid; disalicylic acid; mono-and di- $C_1$–$C_8$ alkyl substituted salicylic acids (such as methyl salicylic acid and 3, 5 di-tertiary butyl salicylic acid); the corresponding benzoic and napthoic acids; 2-nitro benzoic acid; 2-amino napthoic acid; and the thio compounds disclosed in copending Application Ser. No. 173,254, entitled "Chromogenic Copy System", filed on Aug. 17, 1981, now U.S. Pat. No. 4,303,719. Of these, preferred are the salicylic acid compounds; particularly salicylic acid, 3, 5 di-tertiary butyl salicylic acid, 3-octyl salicylic acid, 5-octyl salicylic acid, 3-tertiary butyl salicylic acid, and 5-tertiary butyl salicylic acid and the invention will be particularly described in connection therewith.

The reaction is effected by reacting the chosen acid with an aldehyde such as formaldehyde, acetaldehyde, glutaraldehyde and the like known reactive aldehydes under alkaline conditions, with formaldehyde being preferred.

As previously noted, the reaction conditions are selected so that only reaction products of low molecular weight are obtained; i.e., A-stage or salicylate alcohols. Toward this end the proportions of reactants, pH, reaction time are maintained within limits discussed below with the temperature being of lesser importance in ensuring oligomeric polymers.

As to proportions, the molar ratio of aldehyde to acid can vary from 3:1 to 0.1:1 with the desired range being about 0.5:1 to 1:1.

The pH of the reaction must be maintained above 7, preferably 9 to 11, in order to avoid high molecular weight polymers and for this purpose the usual alkaline materials, such as sodium hydroxide or ammonium hydroxide can be added to the reaction mixture as needed to maintain the proper pH.

With respect to reaction time, while this will vary dependent upon the particular reactants and the temperature, it should be no longer than three hours, preferably 10 to 45 minutes, at ambient pressure and a temperature of about 100° C. or below; preferably 40° to 90° C.

The reaction can be carried out in any suitable reaction vessel and the oligomer recovered in the usual manner.

The resultant oligomer can be used as such or the corresponding metal salts. These are formed by reacting with acidic oligomer with zinc, aluminum, monovalent alkali metal compounds, or other known metallic compounds conventionally used to form salts of acids used as color developers in carbonless copy systems.

Any of the noted instant oligomeric color developers can be formulated in several different ways to provide coated transfer sheets which possess the desirable properties of high speed of image formation, high image intensity, excellent stability upon exposure to atmospheric conditions, ease of preparation and application of the coating solution, and elimination of environmental and health hazards during their preparation and use. Furthermore, the various modes of formulating the materials of the present invention allow these materials to be coated onto paper webs at high coating speeds and low coating weights, resulting in economically attractive copying systems.

Another major advantage of the materials of the present invention is that they can possess adhesive properties. Due to this feature, when formulated into coatings the requirement for additional binder may be substantially reduced or even obviated.

The color developers utilized in the present invention can be used in chromogenic copy systems in the same proportions as conventional color developers.

They can be formulated in several different ways depending upon the mode of application and the desired properties of the end product. For example, in using conventional paper coaters, such as air-knife, gate-roll, blade, reverse roll, and the like, these materials can be formulated in a water medium, with or without conventional adhesives (binders) such as partially or fully hydrolyzed polyvinyl alcohols, natural or modified starches, latexes, proteins, gums, and the like. Optionally, in the water-based formulations, inorganic or organic extending materials such as carbonates, inert clays (such as kaolins and bentonites) may be used to extend the surface of the active ingredients. Alternatively, the materials of the present invention can be formulated into "fountain solutions" or "inks" using water-miscible solvents such as alcohols and ketones, or water-immiscible solvents such as xylene, toluene, benzene, mineral seal oil, alkylated naphthalenes, and the like.

The "fountain solutions" and "inks" may be applied to the web on commercial printing presses using various printing methods such as wet and dry offset, and direct letter presses and like conventional equipment.

While not studied, it is believed that the oligomers of salicylates known to have pharmaceutical properties such as analgesics, antipyretics, and anticlotting activity (such as aspirin) will have enhanced properties and less side effects.

The invention will be further described in connection with the examples that follow, which are set forth for purpose of illustration only.

EXAMPLE 1

One hundred and twenty grams of salicylic acid are dissolved in a solution of NaOH in water and the pH of the solution is adjusted to between 9 and 11. To this solution, 160 grams of formalin solution (37% by weight) are added and refluxed at 90° to 100° C. for periods of up to 200 minutes. During the course of the reaction, the pH of the solution is maintained at between 9 and 11 with the occasional addition of NaOH. Aliquot portions are withdrawn from the reaction flask at various time intervals and treated and formulated in one of several ways described below:

Case 1

Twenty grams of the dried solid product were dissolved in approximately 40 gms of 5% by weight aqueous solution of Lithium hydroxide monohydrate to give a final solution pH of between 6.2 and 7.5. To this solution, 150 grams of hydrated alumina (Reynold's Paperad) and 75 gms of a 20% by weight aqueous solution of ethylated starch (Penik & Ford's Pencote) were added, dispersed thoroughly and coated onto a paper web at a coating weight of 3.5 gms/$m^2$ to form a receptor sheet (CF). When this receptor sheet was imaged with a capsule-coated, crystal violet lactone (CVL) containing sheet coated back (CB), quick, brilliant blue images were produced. These images remained stable even after prolonged exposures to conditions of high heat, high humidity and strong sunlight. Furthermore, exposing the receptor sheet to these accelerated aging conditions of light, temperature and humidity, did not deteriorate either the appearance or the ability of the receptor sheet to form good, stable images even after the exposure.

Case 2

To an aliquot portion withdrawn from the reaction flask after 30 minutes of reaction time, an equimolar amount of $ZnSO_4$ (equimolar to the precalculated amount of salicylic acid contained in the aliquot) is added and the pH of the solution adjusted to between 9–10.5 with ammonium hydroxide. The liquid product was formulated into receptor sheet as in Case 1 and identical results are obtained.

Case 3

Case 2 was repeated, but the pH of the solution was adjusted to 10.5 with NaOH prior to formulating the receptor sheet. Identical results are obtained.

EXAMPLE 2

Example 1 was repeated but the amount of salicylic acid is replaced by an equivalent amount on a molar basis by 3,5 di-tertiary butyl salicylic acid.

Cases 1, 2, and 3 are repeated with similar results.

EXAMPLE 3

Example 1 is repeated, but the amount of salicylic acid used is 460 grams while the amount of formalin solution used is 400 grams. All other reaction conditions are kept the same.

Cases 1, 2, and 3 are repeated and the results obtained are similar.

EXAMPLE 4

Solution A: Twenty-five grams (0.01 moles) of 3,5 di-t-butyl salicylic acid were dissolved in 100 grams of a 5% by weight aqueous solution of Lithium hydroxide monohydrate. The pH of the solution was adjusted to between 9 and 10 with the addition of about 3 grams of $ZnCl_2$. To this solution, 0.8 grams of a 37% by weight aqueous solution of formaldehyde (0.01 moles) were added and the solution was heated to 75° C. for 15 minutes and cooled to room temperature.

Solution B: Two hundred and fifty grams of $CaCO_3$ were dispersed in 100 grams of a 20% by weight aqueous solution of ethylated starch.

Solutions A and B were thoroughly interdispersed and coated onto a paper substrate at a coating weight of 4 gms/$m^2$ and dried. The receptor sheet thus produced, generated brilliant, blue, stable images when imaged upon with a CVL-containing CB.

EXAMPLE 5

Example 4 was repeated, but the 250 grams of $CaCO_3$ in Solution B were replaced with 250 grams of ZnO. Equivalent results were obtained.

EXAMPLE 6

Example 4 was repeated, but the 250 grams of $CaCO_3$ in Solution B were replaced with 200 grams of hydrated alumina (Reynolds Chemicals' Paperad), and 50 grams of Georgia Kaolin's Hydrafine clay. Equivalent results were obtained.

EXAMPLE 7

Example 4 was repeated, but the 100 grams of the starch solution in Solution B were replaced with 50 grams of a 20% by weight aqueous solution of an 88% hydrolized polyvinyl alcohol (Airco's Vinol-205). Equivalent results were obtained.

EXAMPLE 8

Example 4 was repeated, but 0.01 moles of glutaraldehyde were used instead of the formaldehyde in Solution A. Equivalent results were obtained.

EXAMPLES 9 THROUGH 12

Examples 4 through 7 were repeated, but in each case 10 grams of isopropanol were added to Solutions A prior to formulating with Solution B. Equivalent results were obtained in all cases.

EXAMPLES 13 THROUGH 17

Examples 4 through 8 were repeated, but the 0.1 mole of 3,5 di-t-butyl salicylic acid was replaced with 0.05 mole of 5,5 thiobis (2-hydroxy benzoic acid) in Solution A. Equivalent results were obtained in all cases.

EXAMPLES 18 THROUGH 21

Examples 4 through 8 were repeated, but the 3,5,di-t-butyl salicylic acid was replaced with the same amount of 5-octyl salicylic acid in Solution A. Equivalent results were obtained.

EXAMPLE 22

Twenty grams of Solution A from Example 4 were diluted with 10 grams of water, applied onto a paper web at a coating weight of 1 gms/$m^2$ and dried. This unpigmented receptor sheet exhibited properties equivalent to the pigment-containing receptor sheets described in Examples 1 and 4.

EXAMPLE 23

Example 18 was repeated, but the dilution was made with 10 grams of isopropyl alcohol containing 1 gram of hydroxy propyl cellulose. Equivalent results were obtained.

EXAMPLE 24

The reaction product of Solution A in Example 4 was precipitated with dilute HCl solution, washed with water and dried. Five grams of the dried product were formulated as a "printing ink" by dissolving them in 50 grams of glycol ether. The ink was applied to a paper web with a rubber roll at a coating weight of 1 gms/$m^2$ and dried. The receptor sheet exhibited properties similar to the non-pigmented receptor sheets produced in Examples 22 and 23.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A pressure-sensitive chromogenic copy system comprising a transfer sheet having on at least a portion of at least one surface thereof a color developer capable of reacting with a chromogen to form a color image, said color developer comprising an oligomeric aromatic carboxylic acid or metallic salt thereof and said oligomer is formed by reacting an aromatic carboxylic acid with an aldehyde at a pH above 7.

2. The pressure-sensitive chromogenic copy system of claim 1 wherein the aromatic carboxylic acid is an unsubstituted or substituted salicylic acid.

3. The pressure-sensitive chromogenic copy system of claim 2 wherein the unsubstituted or substituted salicylic acid is selected from salicylic acid, acetyl salicylic acid, or a mono- or di-$C_4$–$C_8$ alkyl substituted salicylic acid and the aldehyde is formaldehyde.

4. The pressure-sensitive chromogenic copy system of claim 3 wherein the unsubstituted or substituted salicylic acid is a substituted salicylic acid selected from 3,5 di-tertiary butyl salicylic acid, 3-tertiary butyl salicylic acid, 5-tertiary butyl salicylic acid, 3-octyl salicylic acid, or 5-octyl salicylic acid.

5. The pressure-sensitive chromogenic copy system of claims 2, 3, or 4 wherein the substituted salicylic acid is 3,5 di-tertiary butyl salicylic acid.

6. A receptor sheet for a pressure-sensitive chromogenic copy system comprising a substrate having on at least a portion of one surface thereof a color developer capable of reacting with a chromogen to form color images, said color developer comprising an oligomeric aromatic carboxylic acid or metallic salt thereof and said oligomer is formed by reacting an aromatic carboxylic acid with an aldehyde at a pH above 7.

7. The receptor sheet of claim 6 wherein the color developer is an oligomer formed by reacting an unsubstituted or substituted salicylic acid with an aldehyde.

8. The receptor sheet of claim 7 wherein the substituted or unsubstituted salicylic acid is selected from salicylic acid, acetyl salicylic acid, or a mono- or di-$C_1$–$C_8$ alkyl substituted salicylic acid and the aldehyde is formaldehyde.

9. The receptor sheet of claims 7 or 8 wherein the unsubstituted or substituted salicylic acid is 3,5 di-tertiary butyl salicylic acid.

10. A coated front and back sheet for a pressure-sensitive chromogenic copy system comprising a substrate having on at least a portion of one surface thereof a coating of chromogen-containing microcapsules and on at least a portion of the other surface thereof a coating of a color developer capable of reacting with said chromogen to form color images, said color developer comprising an oligomeric aromatic carboxylic acid or metallic salt thereof and said oligomer is formed by reacting an aromatic carboxylic acid with an aldehyde at a pH above 7.

11. The coated front and back sheet of claim 10 wherein the aromatic carboxylic acid is an unsubstituted or substituted salicylic acid.

12. The coated front and back sheet of claim 11 wherein the unsubstituted or substituted salicylic acid is selected from salicylic acid, acetyl salicylic acid, or a mono- or di-$C_1$–$C_8$ alkyl substituted salicylic acid and the aldehyde is formaldehyde.

13. The receptor sheet of claims 11 or 12 wherein the unsubstituted or substituted salicylic acid is 3,5 di-tertiary butyl salicylic acid.

14. The method of making an oligomeric aromatic carboxylic acid or metallic salt thereof suitable for use as a color developer capable of reacting with a chromogen to form a color image comprising reacting an aldehyde with an aromatic carboxylic acid in a molar ratio of from 3:1 to 0.1:1 at a pH above 7 and at a temperature below about 100° C. for a period not exceeding three hours and recovering the resultant oligomer.

15. The method of claim 14 wherein the aromatic carboxylic acid is an unsubstituted or substituted salicylic acid and the aldehyde is formaldehyde.

16. The method of claim 15 wherein the unsubstituted or substituted salicylic acid is selected from salicylic acid, acetyl salicylic acid, or a mono- or di-$C_1$–$C_8$ alkyl substituted salicylic acid.

17. The method of claims 15 or 16 wherein the unsubstituted or substituted salicylic acid is 3,5 di-tertiary butyl salicylic acid.

* * * * *